United States Patent
Kroll et al.

(10) Patent No.: US 7,562,394 B2
(45) Date of Patent: *Jul. 14, 2009

(54) PERSONAL MEDIA PLAYER APPARATUS AND METHOD

(75) Inventors: Mitchell Kroll, Solon, OH (US); Steven Spilman, Moreland Hills, OH (US); Blake Squires, Akron, OH (US); Christopher Celeste, Shaker Heights, OH (US); Lauren Spilman, Moreland Hills, OH (US)

(73) Assignee: Findaway World LLC, Chagrin Falls, OH (US)

( * ) Notice: Subject to any disclaimer, the term of this patent is extended or adjusted under 35 U.S.C. 154(b) by 693 days.

This patent is subject to a terminal disclaimer.

(21) Appl. No.: 11/029,419

(22) Filed: Jan. 6, 2005

(65) Prior Publication Data

US 2006/0020901 A1    Jan. 26, 2006

Related U.S. Application Data

(60) Provisional application No. 60/590,364, filed on Jul. 23, 2004.

(51) Int. Cl.
*G06F 17/30* (2006.01)
*G06F 12/14* (2006.01)

(52) U.S. Cl. ............................. 726/26; 713/194
(58) Field of Classification Search ................ None
See application file for complete search history.

(56) References Cited

U.S. PATENT DOCUMENTS

| | | | |
|---|---|---|---|
| 5,627,549 A | 5/1997 | Park | |
| 5,929,848 A | 7/1999 | Albukerk et al. | |
| 5,956,629 A | 9/1999 | Morrison | |
| 6,142,869 A | 11/2000 | Meyer et al. | |
| 6,367,019 B1 | 4/2002 | Ansell et al. | |
| 6,385,596 B1 | 5/2002 | Wiser et al. | |
| 6,490,432 B1 | 12/2002 | Wegener et al. | |
| 6,728,729 B1 | 4/2004 | Jawa et al. | |
| 2002/0077988 A1* | 6/2002 | Sasaki et al. | 705/59 |
| 2002/0112250 A1 | 8/2002 | Koplar et al. | |
| 2003/0016940 A1 | 1/2003 | Robbins | |
| 2003/0104824 A1 | 6/2003 | Hale et al. | |
| 2004/0059927 A1* | 3/2004 | Chen | 713/189 |

(Continued)

FOREIGN PATENT DOCUMENTS

EP    0697670 A1    2/1996

(Continued)

OTHER PUBLICATIONS

"Guard Dogs"; Nov. 7, 2002; http://www.miracles4fun.com/guard-dogs.html; 2 pages.

(Continued)

*Primary Examiner*—Brandon S Hoffman
(74) *Attorney, Agent, or Firm*—Baker & Hostetler LLP (57) ABSTRACT

A compact portable, self contained digital media player is provided whose content is not recordable or removable by a user. The content is reproduced in a high fidelity format. The binding of the content to the media player results in a significant degree of copyright protection. The compactness of the player enables binding of the player with various products. Also, the binding of content enable its instant playability.

51 Claims, 7 Drawing Sheets

U.S. PATENT DOCUMENTS

2006/0020890 A1    1/2006  Kroll et al.
2008/0065246 A1*   3/2008  Zorkendorfer et al. ........ 700/94

FOREIGN PATENT DOCUMENTS

| JP | 2003241698 | 8/2003 |
| WO | WO 2004/114303 A1 | 12/2004 |
| WO | WO 2006/051629 A1 | 5/2006 |

OTHER PUBLICATIONS

Supplementary European Search Report mailed Mar. 19, 2008; 4 pages.
http://www.sdcard.org/news/2006_12_04_sdcard.pdf; whole document; Dec. 4, 2006.
http://www.sdcard.org/news/2006_01_04_sdcard.pdf; whole document; Jan. 4, 2006.
International Search Report dated May 30, 2008; 5 pages.

* cited by examiner

PERSONAL MEDIA PLAYER APPARATUS AND METHOD

CROSS-REFERENCE TO RELATED APPLICATIONS

This application claims priority to provisional U.S. patent application entitled, "PERSONAL MEDIA PLAYER AND METHOD FOR USE THEREOF," filed Jul. 23, 2004, having a Ser. No. 60/590,364, and to non-provisional U.S. patent application entitled "METHOD FOR COMMERCIALIZATION AND ADVERTISING USING A PERSONAL MEDIA PLAYER," filed Oct. 29, 2004, having Ser. No. 10/975,534, the disclosures of which are hereby incorporated by reference in their entirety.

FIELD OF THE INVENTION

The present invention relates generally to portable personal media player. More particularly, the present invention relates to a personal digital media player having a fixed, pre-loaded content for playing entertainment, advertising, providing information, education, etc. for a user.

BACKGROUND OF THE INVENTION

Conventional approaches to audio and visual media are primarily focused on providing entertainment to the consumer. To facilitate this objective, entertainment related industries have developed a diverse inventory of electronic devices that provide a mechanism for a consumer to enjoy recorded entertainment or information. Such examples are, of course, DVD players, CD players, DAT players, mini-Disc players, TiVo, and the like. However, all of these devices are presumed to be a consumer-purchased item, separate from the content placed therein, the devices all having user recordable content capabilities. All of these personal players are also designed for easy transfer of digital content, by the consumer, to the players.

With the advent of digitally coded content and the ease of communicating digital information, copyright protection of the loaded content has become an ever increasing concern in the entertainment industry. Therefore, there has been heretothereto no satisfactory mechanism for preventing the unauthorized copying of digital entertainment or information stored onto the player.

It is also recognized that entertainment has within it secondary or consumer influence attributes such as advertising, cross marketing, or branding, when used in addition to the entertainment. The full potential of such secondary value has not been fully exploited because the played entertainment or content is often experienced in a surrounding that is disassociated from the seller of the player, who may be a sponsor of the entertainment or content. Thus, secondary value, such as tying the content in the player to the seller's venue cannot be exploited.

Therefore, there has been a longstanding need for systems and methods that safeguard copyright protection and also enable correlation of the content with the seller's venue or objective.

SUMMARY OF THE INVENTION

The foregoing needs are met, to a great extent, by the present invention, wherein in one aspect an apparatus is provided that in some embodiments the content in a media player is non-rerecordable, thereby the content can not be down loaded from or uploaded to the player, by the consumer.

In accordance with one embodiment of the present invention, a personal, fixed digital content media player, is provided comprising, a microprocessor, a memory coupled to the microprocessor, the memory being inaccessible to a user and digital content to be stored in the memory being inalterable by the user, a digital-to-analog converter (DAC) coupled to the microprocessor, a headphone jack coupled to the DAC, a control interface controlling operation of the player, and a compact, handheld size casing housing the microprocessor, memory, DAC, headphone jack and control interface.

In accordance with another embodiment of the present invention, a system for loading a personal, fixed digital content media player, is provided, comprising, a microprocessor, a memory coupled to the microprocessor, the memory being inaccessible to a user and digital content to be stored in the memory being inalterable by the user, a digital-to-analog converter (DAC) coupled to the microprocessor, a headphone jack coupled to the DAC converter, a control interface controlling operation of the player, a compact, handheld size casing housing the microprocessor, memory, DAC, headphone jack and control interface, a content loader interface interior to the headphone jack, wherein content to be stored in the memory is loaded into the memory via an insertion of an elongated contact into the headphone jack, making contact with the content loader interface, and a data bus coupled to the content loader interface.

In accordance with another embodiment of the present invention, a system for loading a personal, fixed digital content media player, is provided, comprising, a microprocessor, a memory coupled to the microprocessor, the memory being inaccessible to a user and digital content to be stored in the memory being inalterable by the user, a digital-to-analog converter (DAC) coupled to the microprocessor, a headphone jack coupled to the DAC, a control interface controlling operation of the player, a compact, handheld size casing housing the microprocessor, memory, DAC, headphone jack and control interface, a content loader interface in an access port within a user-removable power source compartment, wherein content is loaded into the memory via an insertion of a loader contact into the access port, and a data bus coupled to the content loader interface.

In accordance with yet another embodiment of the present invention, a personal, fixed digital content media player, is provided, comprising, processing means for processing digital information, storage means for storing digital information, the storage means being coupled to the processing means, wherein the storage means is inaccessible to a user and digital content to be stored in the storing means is inalterable by the user, conversion means for converting the processed digital information into analog information, the conversion means being coupled to the processing means, coupling means for coupling the analog information to a listening means, the coupling means being coupled to the conversion means, control means for controlling operation of the player, the control means being coupled to the processing means, and a covering means for enclosing the above processing, storage, conversion, coupling, and control means, the covering means being of a handheld size.

In accordance with yet another embodiment of the present invention, a system for loading a personal, fixed digital content media player, is provided, comprising, processing means for processing digital information, storage means for storing digital information, the storage means being coupled to the processing means, wherein the storage means is inaccessible to a user and digital content to be stored in the storing means is inalterable by the user, conversion means for converting the processed digital information into analog information, the conversion means being coupled to the processing means, coupling means for coupling the analog information to a listening means, the coupling means being coupled to the conversion means, control means for controlling operation of the player, the control means being coupled to the processing means, a covering means for enclosing the above processing, storage, conversion, coupling, and control means, the covering means being of a handheld size, a loading means for loading digital information into the player, and a bus means for conveying signals coupled to the loading means.

In accordance with yet another embodiment of the present invention, a method assembling a personal, fixed content, digital media player, is provided, comprising the steps of, coupling a microprocessor to a fixed memory, coupling a digital-to-analog converter (DAC) to the microprocessor, coupling a headphone jack to the DAC, coupling a control interface, controlling operation of the player to the microprocessor, encasing the microprocessor, memory, DAC, headphone jack and control interface in a compact, handheld size casing, and preventing the memory from being accessed by a user and preventing digital content to be stored in the memory from being altered by the user.

In accordance with yet another embodiment of the present invention, a personal, fixed digital content media player, is provided comprising, a single chip device capable of performing the functions of a microprocessor, memory, and digital-to-analog converter (DAC), a headphone jack coupled to the single chip, a control interface controlling operation of the player, and a compact, handheld size casing housing the single chip, headphone jack and control interface, wherein the memory is inaccessible to a user and digital content to be stored in the memory is inalterable by the user.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. Various embodiments in accordance with the present invention provide systems and method for a media player having a fixed, non-consumer recordable content. The binding of the content to the player reduces unauthorized copying of the content and also enables the appearance of the player to be tailored to the content.

Figure 1:
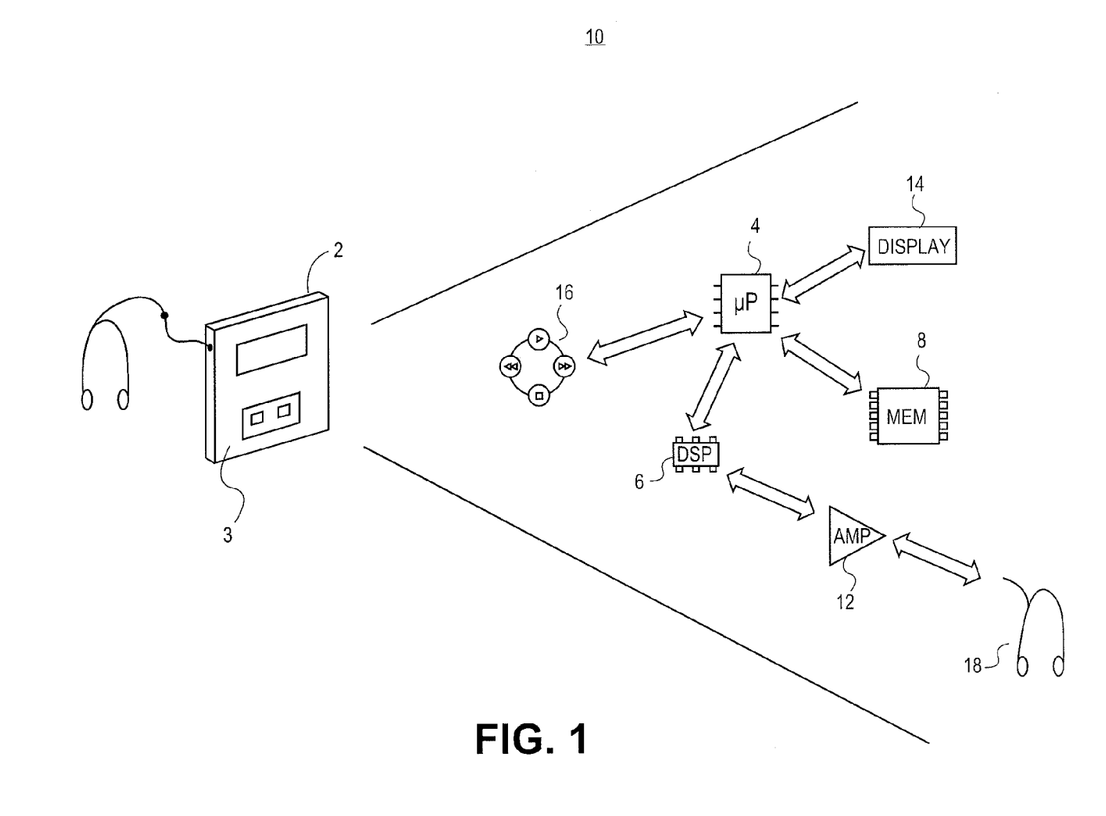
FIG. 1 is a functional illustration of an exemplary embodiment of the invention.

A functional illustration 10 of an exemplary player 2 is provided in FIG. 1. The exemplary player 2 is effectively illustrated in FIG. 1 as a personal, portable media player 2 having digitally encapsulated fixed content therein, that is non-consumer modifiable. The player 2 is generally configured with a microprocessor (uP) 4 and/or digital signal processor (DSP) 6 for processing and converting the digital content contained in memory 8 for amplification by an amplifier/digital-to-analog converter (DAC) 12.

The microprocessor 4 is coupled, directly or indirectly, to an optional display 14, which displays information relating to the content and/or the status of the player 2. For example, the display 14 may be a liquid crystal display (LCD) or an organic light emitting diode (OLED), which monitors the battery status, play status, song title/artist/time, etc. The display 14 can also, in various exemplary embodiments, operate as a screen for video playback or photo illustration and is preferably designed to consume nominal power to conserve energy. Power conservation schemes for the microprocessor 4 and DSP 6 may also be used, as according to design preference.

The microprocessor 4 also operates to respond to user input in the control interface 16. The control interface 16 contains standard control functions, such as, for example, volume, play, stop, fast forward/skip, reverse, etc. Other control functions, such as, for example, mode select, pause, random play, equalizer, bass/treble, etc., may be implemented according to design preferences.

Based on the type of microprocessor 4 utilized, the DSP 6 may not be necessary for various exemplary embodiments. This is, it is well known that some microprocessors are capable of performing DSP functions, therefore, depending on the sophistication of the microprocessor chosen and the type of decompression/conversion being performed on the stored content, the DSP 6 may not be a necessary element for performing the desired function. Accordingly, the microprocessor 4 may be directly coupled to the amplifier/DAC 12, for amplifying the content extracted from the memory 8.

Of course, it should be appreciated that while FIG. 1 illustrates the memory 8 as having a "chip" like appearance, any type of memory capable of storing digital content may be used. For example, any memory whether in a single or distributed configuration or, as commonly used, such as ROM, flash, DTP, etc., may be used for storing the content. It should also be appreciated that the memory 8 may be integrated into the microprocessor 4 or DSP 6. That is, it is well known that microprocessors or DSP's are capable of being designed with built-in memory, whether in cache and/or static form. Therefore, based on the availability and size of built-in memory, the stand alone memory 8, as a separate component, may not be necessary.

The digital content stored in the memory 8 may be in compressed form, according to any one or more of now known or future compression schemes, such as, for example, MP3, WAV, RA, OGG, AAC, Atrac, WMA, and WMx, etc. Video content can be accommodated, therefore, compression such as MPEG, WMV, JPEG, DV, and DiVx, etc. can be used. Compression, whether lossy or non-lossy, is desired to increase the amount of content storable in the memory 8. Base on the compression scheme utilized, and the type of fidelity desired, the content stored may encompass any type of storable content, ranging from a series of songs, an audible book, a movie, etc. The compressed content is decompressed or converted by the microprocessor 4 and/or the DSP 6, which is amplified and converted by the amplifier/DAC 12. The amplified content stream is conveyed to headphones 18 for aural presentation and to optional display 14 for visual presentation to the user.

Portions of or the entire control interface 16 may be attached to the headphones 18 to conveniently enable a user to control the player 2, or the headphones 18 may be of a wired variety or non-wired, comprising one or more speaker elements. Additionally, the headphones 18 may be integrally attached to the player 2, so as to prevent removal from the player 2, or, as seen in conventional player systems, removably attached.

In the various exemplary embodiments having removable headphones 18, the headphone jack (not shown) is preferably, but not necessarily, a standard headphone stereo jack, so as to enable compatibility with standard headphone jack mating equipment. Accordingly, the player's headphone jack (not shown) may be connected to a home stereo or other systems to enable the user to enjoy the content using speakers or amplifiers other than that of the player's. The headphone jack may additionally facilitate the use of an FM tuner/broadcaster or other broadcast or playback mechanism, as is commonly seen in other portable electronic devices.

An enclosure or "skin" 3 is illustrated in FIG. 1 as encompassing the player 2. The skin 3, in addition to providing an enclosure for the player 2, may be configured to with a design for visual branding of elements tied to the content in the memory 8 or to a third-party. The configuration of the skin 3 may comprise a design and/or a shaping of the form of the enclosure. For example, the skin 3 may be shaped in the form of Mickey Mouse ears to convey a Disney-related content in the player 2. The skin 3 or exterior of the player 2 can also be altered to enable easier "wearablity" of the player 2. For example, a ring or hole in the skin of the player 2 can be accommodated to facilitate a lanyard, a clip, etc., to enable attachment to a user's person.

In various exemplary embodiments, the content encapsulated in memory 8 is understood to be non-re-recordable by the user/consumer. As stated above, the content may be of any form of digital audio, video, audio/video, multimedia, textual, graphical, etc., or any combination thereof. The content is pre-loaded into the memory 8 prior to the user's receipt and, thus cannot be manipulated, overwritten, re-recorded by the user. The memory 8, may be separately loaded from the player 2, having content pre-loaded therein and, thereafter, inserted into the player 2, either during the player's 2 assembly or prior to distribution to a user.

It should be appreciated that, upon processing the digital information or content from the memory 8, a step of performing a conversion from a digital format to an analog format is accomplished by the use of digital-to-analog converters DAC (shown in FIG. 1 as a combined amplifier/DAC 12). The DAC may be a separate component from the amplifier and thus implemented between the microprocessor 4/DSP 6 unit and the amplifier 12. Alternatively, the DAC may be situated between the amplifier 12 and the headphones 18 and/or the display 14.

Figure 2:
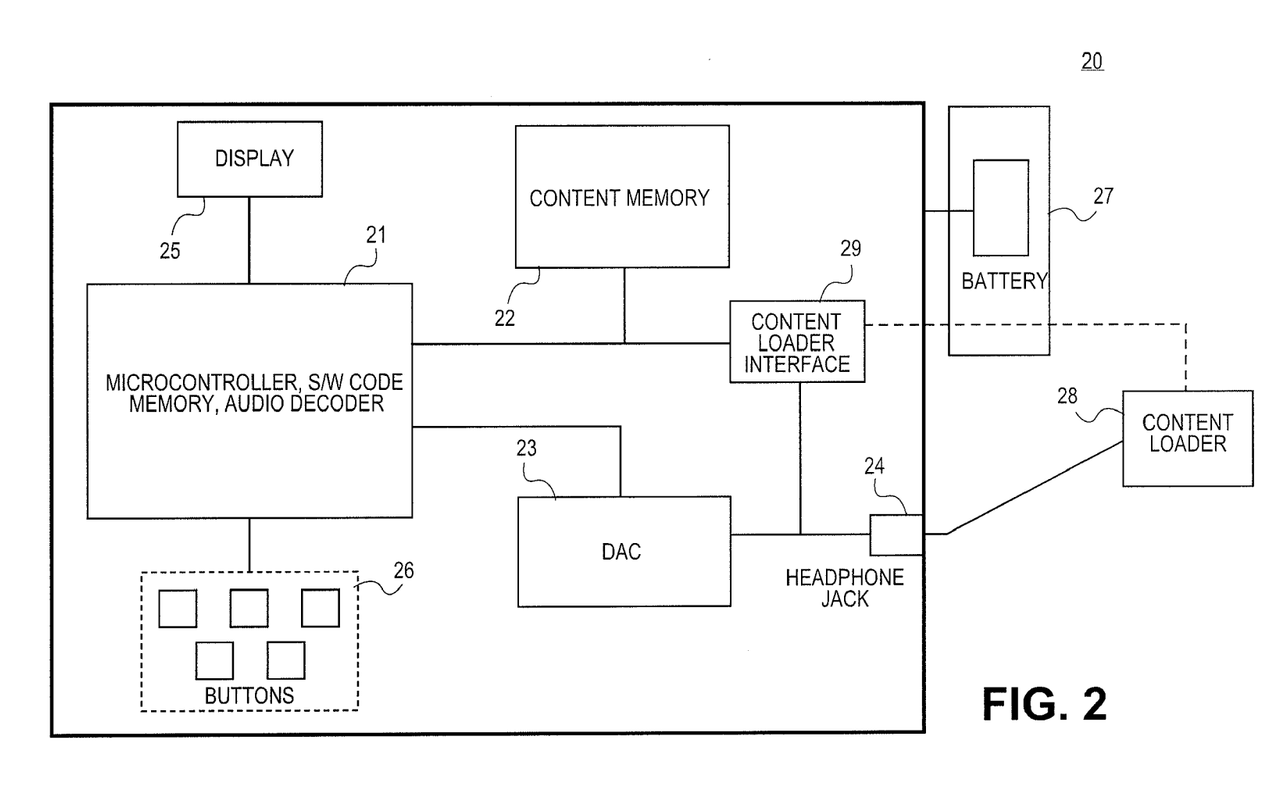
FIG. 2 is a block diagram of another exemplary embodiment.

Given that in a semiconductor or integrated circuit environment, it is possible to fabricate devices having multiple or combined capabilities of several discrete devices, for example, combining an amplifier and DAC as discussed above, it should be appreciated that alternative circuit structures or devices, whether individually or corporately, may be implemented without departing from the spirit and scope of this invention. For example, a combined microprocessor/DSP chip or device may be used as a processing engine. Similarly, a combined microprocessor/memory chip or device may be used as a processing and memory engine, to reduce the count of discrete components of the exemplary player. Accordingly, while the exemplary embodiments described in FIGS. 1 and 2 show separate devices performing separate functions, it is possible, in state-of-the art system integration foundries, to fabricate multiple devices on a single chip or platform, such that all or a majority of the devices and components discussed herein may be implemented as a single chip or single device solution. Thus, a single chip or single device that has been designed with multiple functions, as according to design preference, may be used in lieu of multiple discrete components.

It should be appreciated that in the exemplary embodiments having a "pre-loaded" content in the memory 8, the memory 8 is prevented from being subsequently removed from the player 2 by the user. The ability to secure the memory 8 and thus the content in the player 2 can be accomplished by using a 1-way mechanical latch in the player 2. Alternatively, an electrical fuse or a coating/lock-out scheme can be implemented in the memory 8, preventing unauthorized removal of the memory 8 from the player 2.

Based on the exemplary player 2, a user upon purchase or acquisition of the exemplary player 2, can immediately enjoy or access the content in the player 2. Thus, the exemplary player 2 provides an "un-wrap and play" functionality. Moreover, since the content in the player 2 is fixed and non-rerecordable, content providers and sponsors of the content/player/skin advertisements do not need to fear wholesale copying of the content, as the content is only playable via the analog output to the headphones 18 or a coupled device through the headphone jack.

FIG. 2 is an illustration 20 of a functional layout of various elements of another exemplary embodiment. The exemplary embodiment of FIG. 2 shares many of the same components that were described in the embodiment of FIG. 1. For example, a microcontroller 21 receives digitalized content from the memory 22. The content is decompressed or processed by the microcontroller 21 and forwarded to the DAC 23. From the DAC 23, the content (now in analog form) is conveyed to the headphone jack 24. The microcontroller 21 also receives inputs from the control 26 and outputs information to the display 25. Given the capabilities of the display 25 chosen and the type of content stored in the memory 22, the content as well as status information may be passed on to the display 25, for viewing by the user.

The illustration of FIG. 2 includes a content loading capability. That is, content loader interface 29 is provided in the exemplary embodiment to enable an exterior content loader 28, to load content into the memory 22. The content loader 28 is illustrated as coupling to the memory 22 via the headphone jack 24. In this configuration, the content loading is facilitated by a prong that protrudes into the headphone jack 24 and mates with the content loader interface 29, to enable electrical communication with the content memory 22 and, if necessary, the microcontroller 21. Accordingly, in embodiments utilizing a headphone jack "through" connection, the content loader interface 29 will be "behind" the headphone jack 24 to enable contact with the external content loader connector. Via this external-to-internal connection, content designated for downloading from the content loader 28 can be communicated into the memory 22, without disassembling the player or requiring the content to be pre-loaded into the memory 22 prior to assembly of the player.

An alternative scheme for externally loading content is also illustrated in FIG. 2 by the dashed line connecting the content loader 28 to the content loader interface 29. In this alternative scheme, an access port is accommodated within the battery housing or battery chamber 27. Via this access port (not shown), the content loader 28 can similarly load content into the memory 22. In this embodiment, it is contemplated that the content loader interface 29 will be exposed or considered accessible when the battery is removed from the battery housing 27. Of course, other access ports or locations may be used according to design preferences.

In an exemplary embodiment of FIG. 2, the connection between the content loader 28 and the content loader interface 29 is a serial interface, which is preferably, but not necessarily, a universal serial bus (USB). Of course, other bus, or communication/transfer methodologies or architectures may be utilized according to design preference, such as, for example, Firewire, USB 2, etc. To prevent user access to memory 22, the content loader interface may be configured with a code key or other mechanism to restrict unauthorized access. Alternatively, a specific sequence of button 21 presses can be used to enable the memory 22 to be loaded. As another alternative, separate hidden buttons are switches could be used to enable programming of the memory 22. The buttons or switches would be accessible by one or more holes located in the casing, which would be covered by the content sheet.

Figure 3:
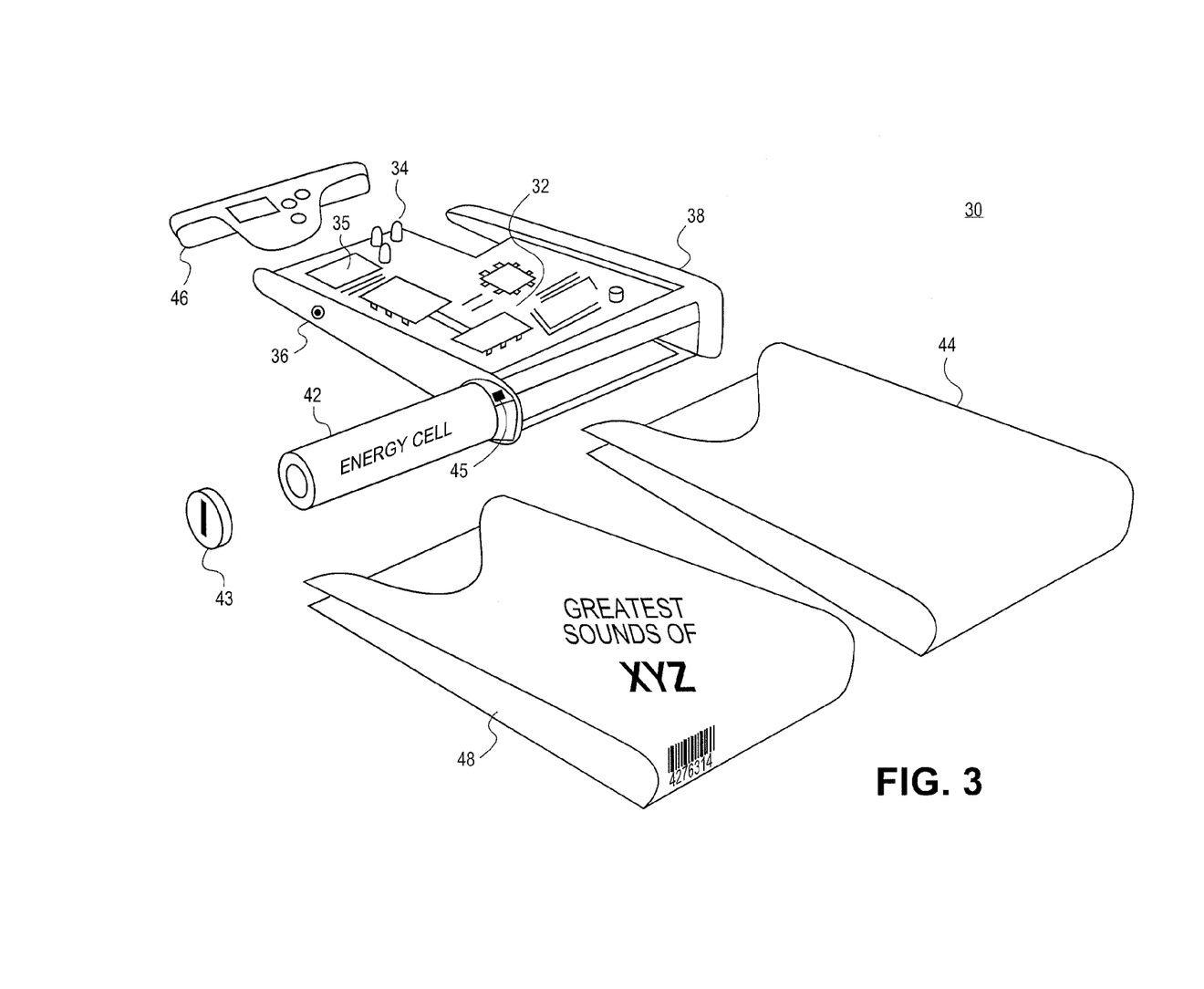
FIG. 3 is an illustration of an exploded view of an exemplary embodiment.

FIG. 3 is an illustration of exploded view 30 of the components of an exemplary embodiment of the invention. The exploded view 30 illustrates printed circuit board (PCB) 32 containing electronics (such as described in FIGS. 1 and 2) for performing the functions of the media player. User controls 34, for controlling the playback and/or interaction with the player, are coupled to the PCB 32. An ear bud jack or external output jack 36 in the casing frame 38 is provided for audio and/or video output. The casing frame 38 provides a supporting structure for the PCB 32 and facilitates containment of a rechargeable or single use battery 42 (preferably, but not necessarily, a AAA battery) which is fixed by a locking or securing cap 43. A casing body 44 is situated over the casing frame 38 to provide a protective cover for the PCB 32 and associated components. Casing top 46 is affixed to the top portion of the casing body 44 to result in a structurally protective casing about the PCB 32 and components. An exterior "branding" of the exemplary player is facilitated by an attachable content sheet 48 that is affixable to the casing.

In various exemplary embodiments, the casing body 44 is desired to be of a compact size to enable users to hand carry the player. The casing body 44 can be significantly smaller than a hand carry size, such as the size of a deck of cards, a matchbox or smaller, depending on design and the target market preference. Also, the casing body 44 may be shaped to conform to a particular product or purpose.

The exemplary player may be configurable with an optional display 35 for illustrating information regarding the content provided in the exemplary player. The display 35 is coupled to the PCB 32 and to the supporting circuitry therein. In an exemplary embodiment, the display 35 is an LCD or OLED having alpha-numeric characters corresponding to the track, chapter, etc. Backlighting of the display 35 may be used according to the design preferences. The display 35 is capable of going into a power conservation mode—e.g., turning off after a specified number of seconds, or by explicit manipulation of the user interface buttons 34. Of course, types of displays 35 other than LCD's or OLED's may be used accordingly to design preference.

It should be appreciated that while FIG. 3 illustrates the various components of an exemplary embodiment of the player as being configured with a casing "top" 46 mated to the casing body 44, alternative arrangements made be contemplated without departing from the spirit and scope of this invention. For example, the casing "top" may be a "bottom" and the casing structures may be a single piece rather than the multiple pieces described herein. Further, the optional display 35 may be placed at other locations in the player.

Through the user interface buttons 34 are illustrated in FIG. 3 as a set of three push buttons which are situated on the PCB 32, it should be appreciated that alternative button types (e.g. switches, toggles, sensors) or configurations or locations may be used. For example, less or more buttons that are capacitive, resistive, or based on other common or future derived interface mechanisms can be implemented. Also, in an exemplary embodiment utilizing buttons, the functionalities of the buttons may be varied according to design preference. These variations of user interface buttons are well known in the art and, therefore, they are not further detailed herein.

For exemplary embodiments capable of being loaded with content after assembly of the player, a bus interface for loading content into the memory is provided. The interface is situated interior to the casing 44 and in accessible through a port 45 located, for example, within the battery slot to enable a coupler to be inserted therein. The interface 45 may also be situated interior to the headphone jack 36, as discussed in FIG. 2. The interface may be coded, electronically or mechanically, to prevent unauthorized loading of content into the player. Methods for defeating unauthorized use of the interface are well known to one of ordinary skill in the art and are, therefore, not detailed herein.

Figure 4:
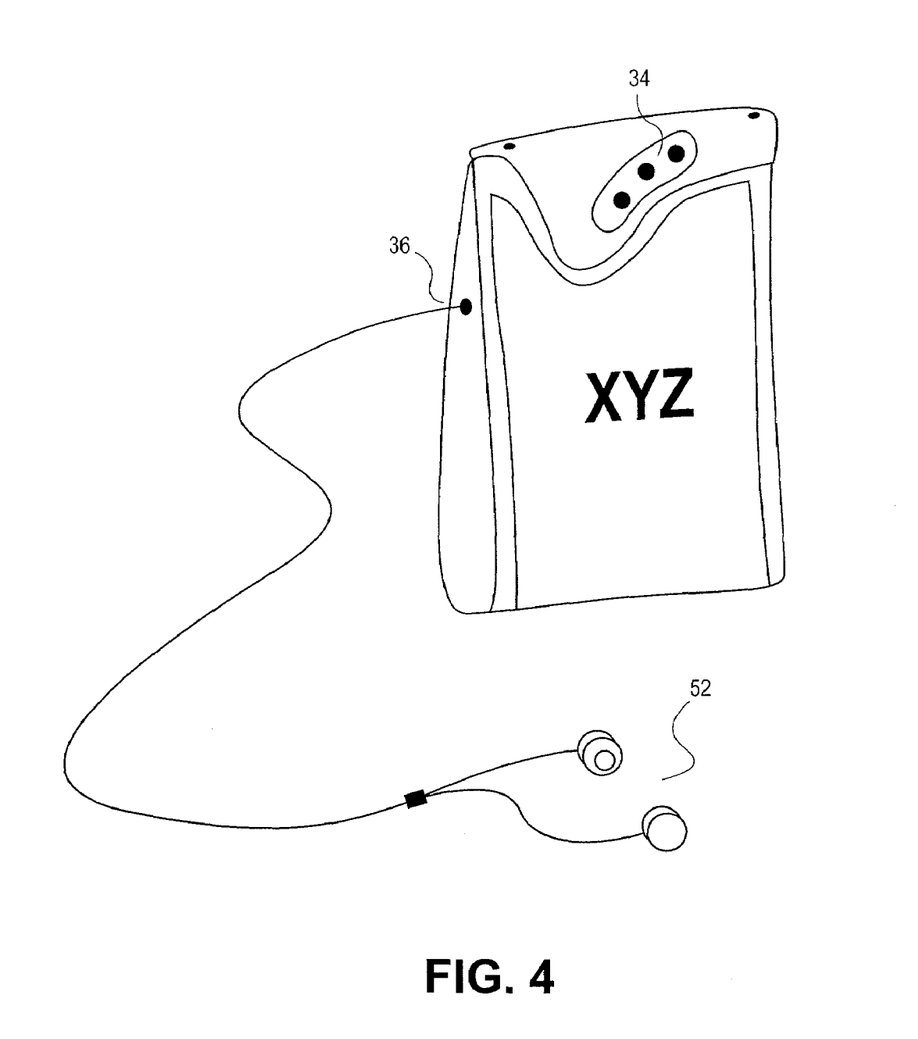
FIG. 4 is an illustration of a front appearance of an exemplary embodiment.

FIG. 4 is an illustration of a front view 40 of an assembled exemplary embodiment. The embodiment of FIG. 4 is a player without a display. Since a display is not provided, the audio content in the player will be keyed with audible cues to the user. For example, when pressing a fast forward button, the microprocessor will generate a tone or sound indicating a fast forward operation. For example, an audible voice saying "fast forward" may be used to notify the user of the "mode" being invoked as being a fast forward operation. Such "tags" could be stored on memory resident in the microprocessor, or may be stored in the content memory.

Further, the content itself may be keyed with information indicating the tile of the song/piece/trade being played. Thus, "metagging" to identify the song, artist, chapter, section, etc. could be encoded into the player as a separate asset or with the content. Methods for adding audible information to assist in tracking the operation of the player are well known and, therefore, not further detailed herein. Such methods may also be utilized in embodiments with a display.

The assembled player of FIG. 4 illustrates the exterior of the player as provided with an image or information relating to the content of the player. The images maybe affixed to the player by use of attachable content sheet as discussed in FIG. 3 or the content sheet maybe obviated by directly imprinting on the player's casing the image or information provided by the "flap." Of course, other methods for placing an image or text on the exterior of the player may be used according to design preference.

Figure 5:
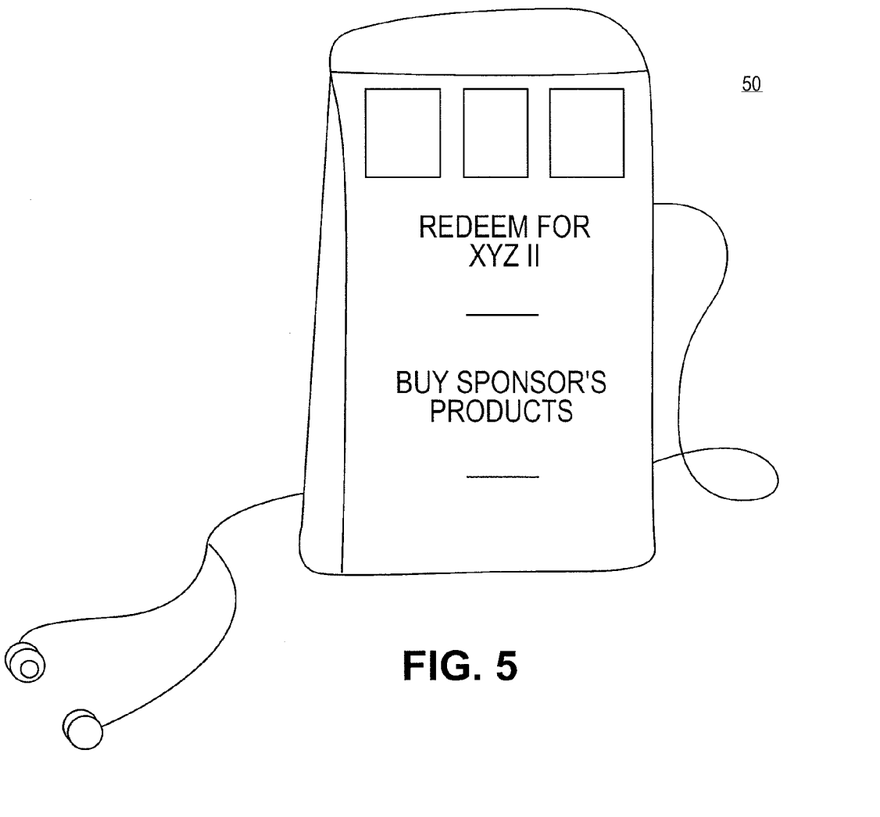
FIG. 5 is an illustration of a back appearance of the exemplary embodiment of FIG. 4.

FIG. 5 is an illustration of a back view 50 of an exemplary player, and is self-descriptive.

Figure 6:
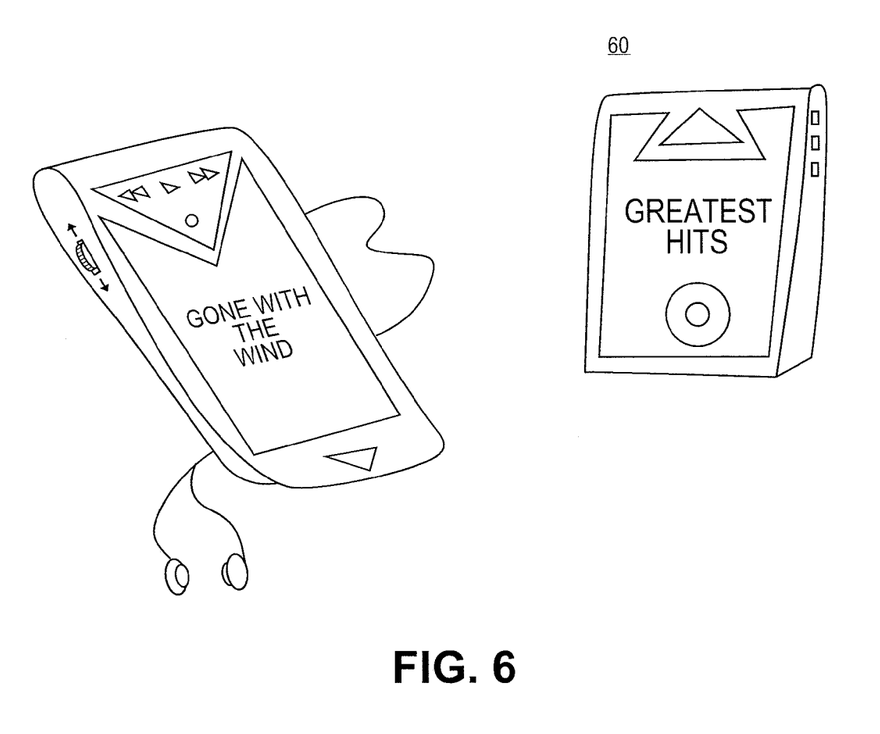
FIG. 6 is an illustration of another appearance of an exemplary embodiment.

FIG. 6 is an illustration 60 of another view of an exemplary embodiment having slightly rearranged button configurations and profile. Accordingly, modifications to the arrangement and the shape, size, attributes, etc. of the player and the components therein may be contemplated without departing from the spirit and scope of this invention.

Figure 7:
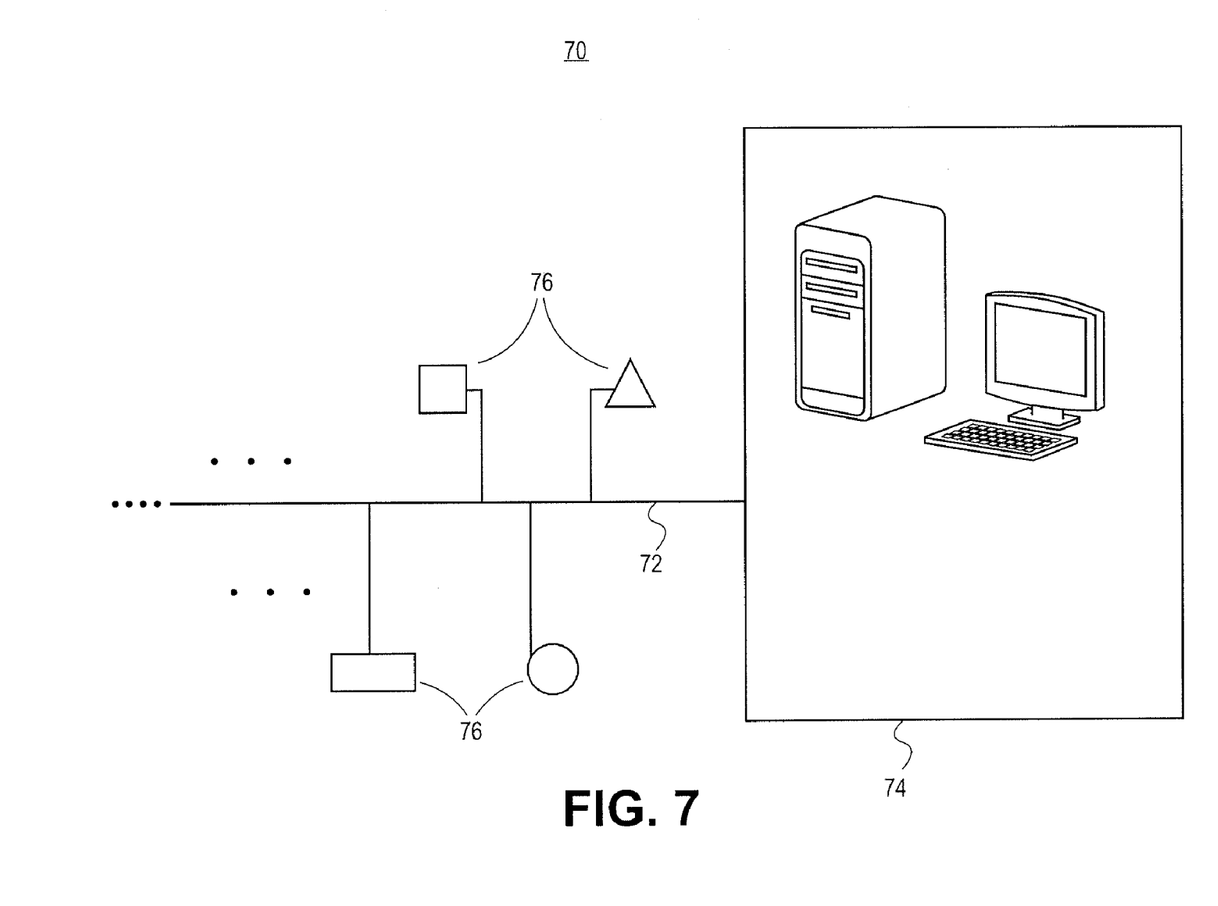
FIG. 7 is an illustration of an exemplary content loading system.

FIG. 7, is an illustration of a content loading system 70 for loading content in a post-assembled operation. Mass loading of content can be facilitated by the use of a communication bus 72 (parallel and/or serial) coupled to a content loader 74 and the "to-be-loaded" players 76. Connection to the players 76 can be accomplished by any of the methods described herein or by methods that are known in the art. The content loader 74 is illustrated in FIG. 7 as a personal computer system, however, it should be appreciated that any computing or data sharing device may be used without departing from the spirit and scope of this invention. It should also be appreciated that in a mass download operation, discrimination or selection of different content to different respective players 76 can be facilitated by a multiplexing the content over the bus and designating codes or protocols that enable different players to receive different content.

While FIG. 7 illustrates a plurality of players being loaded or programmed, a single player loading action can be performed as well. For example, a laptop or similarly functioning device, pre-configured to operate as a content loader 74 may be used to load content into a single player 76 at a kiosk or a store. It should be appreciated that in a store or kiosk environment, the skin or content sheet may be custom made "on the spot" and affixed to the player to afford a degree of customability to the player and for the customer.

It should be appreciated that the many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly various modifications and equivalence maybe resorted to, falling within the scope of the invention.

What is claimed is:

1. A personal, fixed digital content media player, comprising:
    a microprocessor;
    a memory coupled to the microprocessor, the memory being inaccessible to a user and digital content to be stored in the memory being inalterable by the user;
    a digital-to-analog converter (DAC) coupled to the microprocessor;
    a headphone jack coupled to the DAC;
    a content loader interface interior to the headphone jack, wherein content to be stored in the memory is loaded into the memory via an insertion of an elongated contact into the headphone jack, making contact with the content loader interface;
    a control interface controlling operation of the player; and
    a compact, handheld size casing housing the microprocessor, memory, DAC, headphone jack and control interface.

2. The media player according to claim 1, wherein high fidelity content to be stored in the memory is playable by the player in high fidelity.

3. The media player according to claim 1, further comprising:
    headphones coupled to the headphone jack.

4. The media player according to claim 3, wherein the control interface is attached to the headphones.

5. The media player according to claim 1, wherein the casing is substantially wedge shaped.

6. The media player according to claim 1, wherein the casing is less than of a handheld size.

7. The media player according to claim 1, wherein the memory is an integrated circuit.

8. The media player according to claim 1, wherein the memory is part of the microprocessor.

9. The media player according to claim 1, further comprising:
    a digital signal processor coupled to the microprocessor.

10. The media player according to claim 1, wherein the microprocessor is a digital signal processor.

11. The media player according to claim 1, further comprising:
    an amplifier coupled to the DAC, wherein the headphone jack is coupled to the amplifier.

12. The media player according to claim 1, further comprising:
    digitized compressed audio content stored in the memory.

13. The media player according to claim 12, wherein the stored content is in a format of at least one of MP3, WAV, RA, WMA, OGG, Atrac, AAC, WMA, and WMx.

14. The media player according to claim 1, further comprising:
    a display coupled to the microprocessor.

15. The media player according to claim 14, further comprising:
    digitized compressed video content stored in the memory.

16. The media player according to claim 15, wherein the stored content is in a format of at least one of MPEG, JPEG, DV, WMV, and DivX.

17. The media player according to claim 1, wherein the interface is a USB interface.

18. The media player according to claim 1, further comprising:
    a content loader interface in an access port within a user-removable power source compartment, wherein content is loaded into the memory via an insertion of a loader contact into the access port.

19. The media player according to claim 18, wherein the interface is a USB interface.

20. A system for loading a personal, fixed digital content media player, comprising:
    a microprocessor;
    a memory coupled to the microprocessor, the memory being inaccessible to a user and digital content to be stored in the memory being inalterable by the user;
    a digital-to-analog converter (DAC) coupled to the microprocessor;
    a headphone jack coupled to the DAC converter;
    a control interface controlling operation of the player;
    a compact, handheld size casing housing the microprocessor, memory, DAC, headphone jack and control interface;
    a content loader interface interior to the headphone jack, wherein content to be stored in the memory is loaded into the memory via an insertion of an elongated contact into the headphone jack, making contact with the content loader interface; and a data bus coupled to the content loader interface.

21. The system according to claim 20, further comprising: a content loader server coupled to the data bus.

22. A personal, fixed digital content media player, comprising:

processing means for processing digital information;

storage means for storing digital information, the storage means being coupled to the processing means, wherein the storage means is inaccessible to a user and digital content to be stored in the storing means is inalterable by the user;

conversion means for converting the processed digital information into analog information, the conversion means being coupled to the processing means;

coupling means for coupling the analog information to a listening means, the coupling means being coupled to the conversion means;

a loading means for loading digital information into the player, wherein the loading means is located interior to the coupling means, wherein digital information to be loaded into the storage means is loaded via physical contact of the loading means with an elongated contact through the coupling means;

control means for controlling operation of the player, the control means being coupled to the processing means; and a covering means for enclosing the above processing, storage, conversion, coupling, and control means, the covering means being of a handheld size.

23. The media player according to claim 22, wherein high fidelity content to be stored in the storage means is playable by the player in high fidelity.

24. The media player according to claim 22, further comprising:

a listening means for listening to the analog information, the listening means being coupled to the coupling means.

25. The media player according to claim 22, wherein the control means is attached to the listening means.

26. The media player according to claim 22, wherein the covering means is substantially wedge shaped.

27. The media player according to claim 22, wherein the covering means is less than of a handheld size.

28. The media player according to claim 22, wherein the storage means is a part of the processing means.

29. The media player according to claim 22, wherein the processing means is a digital signal processing means for specially performing digital signal processing.

30. The media player according to claim 22, further comprising:

an amplifying means for amplifying signals, coupled to the conversion means, wherein the coupling means is coupled to the amplifying means.

31. The media player according to claim 22, further comprising:

decompression means for decompressing the stored information.

32. The media player according to claim 22, further comprising:

a display means for displaying a status of the player's operation, coupled to the processing means.

33. A method assembling a personal, fixed content, digital media player, comprising the steps of:

coupling a microprocessor to a fixed memory;

coupling a digital-to-analog converter (DAC) to the microprocessor;

coupling a headphone jack to the DAC;

coupling a content loading interface interior to the headphone jack, wherein content to be stored in memory is loaded into memory via an insertion of an elongated contact into the headphone jack, making contact with the content loading interface;

coupling a control interface, controlling operation of the player to the microprocessor;

encasing the microprocessor, memory, DAC, headphone jack and control interface in a compact, handheld size casing; and preventing the memory from being accessed by a user and preventing digital content to be stored in the memory from being altered by the user.

34. The method according to claim 33, further comprising the step of:

enabling high fidelity content to be stored in the memory to be playable by the player in high fidelity.

35. The method according to claim 33, further comprising the step of:

coupling a headphone to the headphone jack.

36. The method according to claim 33, wherein the casing is substantially wedge shaped.

37. The method according to claim 33, further comprising the step of: coupling a display to the microprocessor.

38. The method according to claim 33, further comprising the step of:

coupling a data bus to the content loading interface.

39. The method according to claim 38, further comprising the step of:

coupling a content loader server to the data bus.

40. The method according to claim 33, further comprising the step of:

coupling a content loading interface in an access port within a user-removable power source compartment, wherein content is loaded into the memory via an insertion of a loader contact into the access port.

41. The method according to claim 40, further comprising the step of:

coupling a data bus to the content loading interface.

42. The method according to claim 41, further comprising the step of:

coupling a content loader server to the data bus.

43. The method according to claim 33, further comprising the step of:

loading digital content into the memory.

44. The method according to claim 43, further comprising the step of:

prohibiting loading of the memory with digital content by a user content loading server.

45. The method according to claim 33, wherein the memory is loaded with content prior to assembly of the player.

46. A personal, fixed digital content media player, comprising:

a single chip device capable of performing the functions of a microprocessor, memory, and digital-to-analog converter (DAC);

a headphone jack coupled to the single chip;

a content loader interface interior to the headphone jack, wherein content to be stored in the memory is loaded into the memory via an insertion of an elongated contact into the headphone jack, making contact with the content loader interface;

a control interface controlling operation of the player; and a compact, handheld size casing housing the single chip, headphone jack and control interface, wherein the memory is inaccessible to a user and digital content to be stored in the memory is inalterable by the user.

47. The media player according to claim 46, further comprising:

digitized compressed audio content stored in the memory.

48. The media player according to claim 47, wherein the stored content is in a format of at least one of MP3, WAV, RA, WMA, OGG, AAC, Atrac, WMA, and WMx.

49. The media player according to claim 46, further comprising: a display coupled to the single chip.

50. The media player according to claim 46, further comprising:

digitized compressed video content stored in the memory.

51. The media player according to claim 50, wherein the stored content is in a format of at least one of MPEG, JPEG, DV, WMV, and DivX.

* * * * *